Patented Jan. 23, 1951

2,539,093

UNITED STATES PATENT OFFICE 2,539,093

NITRIC ACID DIGESTION OF STRAW

Henri Mainguet, Paris, France

No Drawing. Application January 6, 1945, Serial No. 571,692. In France February 11, 1944

3 Claims. (Cl. 92—9)

The methods known at the present time for extracting cellulose from fibrous and vegetable matters consist in treating the raw material either by a solution of a chemical agent which attacks the incrustant substances and dissolves it or by two solutions, the first of which attacks the incrustant substances, while the second makes these substances soluble and/or dissolves them. These main treatments are sometimes preceded by other treatments which are intended to dissolve some constituents of the matter and/or to facilitate the impregnation of the main disincrustation lye. In all cases, the reaction of the chemical element on the noncellulosic substances present in the matter to be treated, takes place in the solution of this agent, which is a serious drawback for reasons which will be hereinafter stated:

First, the amount of chemical agent used for attacking the non-cellulosic substances treated in the solution in question corresponds to several times the amount I have found to be sufficient for attacking these non-cellulosic elements. But, as it is practically not possible to stop the reaction just when the whole of these elements have been attacked, the cellulose which is then, at some places, in direct contact with this chemical agent, is more or less deteriorated by the excess of this chemical agent.

This deterioration is the more important as it takes place at the end of the reaction, that is to say at the time when the temperature is maximum. Unavoidably it lowers the yield of cellulose and makes it impossible to obtain a regular quality thereof.

Furthermore, the solution for the treatment of the raw material contains, after digestion, an important amount of the chemical agent above referred to, and it is of course interesting to recover it. But this recuperation necessitates tanks, apparatus and operations which are expensive, because this solution is very much altered by the thermal treatment it has undergone. Finally, the matter retains, after digestion, an amount of lye equal in liters, to from two to five times, according to the nature of this matter, of the weight thereof in kilograms. As the concentration of this solution is then but little lower than before the treatment, a proportionally important amount of the chemical agent is retained in the matter and should also be recuperated by washing. The cost of all these operations is so high that it partly destroys the interest of recuperation.

The object of the present invention is to provide a method which obviates these various drawbacks.

In order that the description may be more clearly understood, the following explanations are given for the various terms hereinafter referred to: "Thorough or efficient impregnation" of the material with the disincrusting agent is present when a sample so impregnated and heated to at least reactive temperature is substantially freed from incrustations within a period of less than 30 minutes. The material is "substantially disincrusted" when after the subsequent treatment of less than 30 minutes to remove the dissolved incrustations a good yield of cellulose of good quality has been obtained. A "good yield" has been produced when the amount of cellulose obtained corresponds to at least 90% of the cellulose originally present in the raw material. "Good quality" designates a content of at least 80% of alpha-cellulose in the resulting material, or is present when the bleaching process engenders a loss of no more than 15%.

This method is essentially characterized by the following features:

1. The reaction corresponding to the attack of the non-cellulosic substances by the chemical agent, instead of taking place in the liquid medium constituted by the solution of said agent, is effected after removal of the excess of said solution, and with the amount thereof that has been retained by the matter treated after impregnation. Advantageously, said matter is imbibed with said solution by atomizing of the latter on the matter disposed in such manner as to form a thin layer;

2. The volume of solution that is retained in the matter is limited, as far as possible, to the volume just sufficient for enabling the matter to be impregnated uniformly and deeply, throughout the mass thereof;

3. The concentration of this solution is so chosen that, as far as possible, there is, in this volume retained by the matter, just the amount of chemical agent necessary for obtaining, through the attack of the desired amount of non-cellulosic substance, a cellulose of the desired quality, for instance an unbleached chemical paste, of light or dark shade, or a semichemical paste.

4. Before producing the reaction through which the non-cellulosic substances are attacked by the chemical agent of the lye, the matter is treated in such manner as to be suitably impregnated by the amount of solution it has retained. This reaction takes place only after this, either in an atmosphere of air or in a neutral or reducing atmosphere, under a pressure equal to atmospheric pressure, or under a higher or lower pressure.

The chief advantage of the method according to the present invention consists in the production of a cellulose of regular quality, with the maximum output. This results from the fact that the operation in the course of which this reaction takes place can be prolonged without danger beyond the time strictly necessary, since the amount of chemical agent retained for this reaction has been limited and is at most (when it is desired to obtain a chemical paste that is thoroughly freed from the incrustant substances) a little more than the amount strictly necessary for the attack of said substances. If the reaction is caused to last for too long a time, the only injury that might be sustained by the mass of cellulose would be a deterioration of a small portion thereof by this small excess of chemical agent. In all other cases, the chemical agent is wholly absorbed by the proportion of non-cellulosic substances to be destroyed, and the mass to be treated may remain for a long time, at the temperature of the reaction, in the presence of the solution, without undergoing any deterioration.

On the other hand, the method according to the invention permits, as it will be easily understood, of reducing to a minimum the consumption of chemical disincrustant. The volume necessary for impregnation is, while remaining a function of the nature of the matter treated, about one litre per kilogram of air dried matter, whereas, in the prior methods, according to which the reaction took place in the bath formed by the solution, from 5 to 12 litres of solution were necessary for every kilogram of matter treated. Therefore the economy obtained with the method according to the present invention may be as high as approximately from 80 to 92 per cent.

This method also permits of reducing the number and volume of the tanks and also the areas and sections of works usually employed for recuperation of the chemical agent. This is due to the following reasons:

On the one hand, the matter is imbibed, either by atomizing and spraying of the solution thereon or by immersion in said solution for a very short time. Consequently, for a given production, the volume of solution that is necessary is considerably reduced.

On the other hand, in the case of imbibition by spraying of atomized solution, the amount of solution that is to be retained by the matter is exactly equal to what is necessary for this purpose, and there is no excess of solution to recuperate. In the case of immersion, the solution is very little altered and requires, for being restored into use, only the addition of a volume of fresh solution equal to the volume, itself very small, carried along by the matter treated, the concentration of this additional solution restoring the initial percentage. Purification is therefore, in this case, but rarely necessary.

After the reaction has taken place, the matter treated contains practically no chemical agent and therefore it is possible not to wash it. However, certain washing operations may be performed in order to recuperate either soluble by-products of the reaction, or small amounts of the chemical agent, if a highly concentrated solution has been used.

The method according to my invention also permits of obtaining an important economy of calories. This results from the fact that, other things being equal, the consumption of calories for the reaction of the chemical agent on the non-cellulosic substances present in the matter treated is substantially proportional to the volumes of solution used for the treatment. Therefore, the economy may be as high as 80-92 per cent, same as for the consumption of nitric acid. It is further increased by the fact that there is no substantial amount of chemical agent to be recuperated in the solutions that have been used for the treatment, and little or not at all in the washing waters. Account should also be taken of the fact that a smaller amount of energy is necessary for conveying these solutions and washing waters.

The method according to the present invention is applicable to fibrous matters and vegetable substances, of any kind whatever. It calls for the use of the chemical products that are generally used in the known methods and it may employ them under the same conditions of concentration, temperature and pressure. It makes it possible to perform the treatment of fibrous matters through all kinds of chemical agents, and advantageously by means of a nitric acid solution. This is very important because nitric acid, although known for a long time as a chemical agent adapted to the treatment of cellulosic matters containing non-cellulosic substances with a view to removing these substances, has never been used for this purpose in an industrial fashion, due to the high consumption of acid and to the expenses necessary for recuperation of this acid carried along by the lyes that have been used for the treatment and by the washing waters.

I will now describe how the method according to the present invention can be carried out when the chemical agent consists of nitric acid, it being well understood that this case constitutes but an example of my method.

The matter is first suitably prepared in such manner as to facilitate its subsequent impregnation, for instance by dividing it into small bits, crushing it, freeing it from the gases it may contain, for instance by the action of vacuum, and so on.

1. According to the invention, this matter is then imbibed, either by spraying of the atomized lye, or by immersion in a nitric acid solution, at ordinary temperature, i. e. 15–20° C., for a very short time, ranging for instance from one second to thirty minutes. This time, which depends upon the nature of the matter, its preparation, its power of retaining the solution and the volume of liquid that is necessary for its uniform and thorough impregnation, is limited to the value just sufficient for enabling the matter to retain this volume.

2. The impregnation of the matter can be obtained in different ways. I will describe two examples, which must not be considered as having any limitative character.

*a. Impregnation during immersion*

The matter is kept in the nitric solution for the time necessary to its being thoroughly impregnated. This time may be reduced by making use of means such as: vacuum, applied either preliminarily or during the immersion, pressure, various stirrings, and so on.

After this time, the matter is separated from the solution. This matter is then charged with a certain volume of solution, which is too important, since it comprises, in addition to the volume impregnated in the matter, the volume physically retained on the surface of said matter. This volume is reduced through any suitable physical means which tend to produce the elimination of the maximum amount of solution superficially carried by the matter, for instance ventilating, dripping, centrifugating, compressing, and so on. For practical purposes, the amount of solution thus removed will be always lower than 40 per cent.

According to a first modification, I first perform an impregnation with water. This impregnation is easier than with an acid, because it can be made in apparatus formed of common materials, and steam and heat can be utilized without any inconvenience. As soon as the matter is impregnated with water, in a thorough manner, it is freed from the excess of water, for instance by centrifugation, if necessary, and imbibed, either by spraying of lye thereon, or by immersion for the suitable length of time in a nitric solution of suitable composition. Through osmosis, the acid penetrates quickly, uniformly and thoroughly into the matter, which is thus perfectly well impregnated with the nitric solution. As above stated, I advantageously remove as much as possible of the nitric solution superficially retained by the matter.

According to a second modification, instead of making use of water for the first impregnation, I may utilize an aqueous solution containing a suitable salt, for instance a nitrate, which will give no chemical reaction with nitric acid when the second impregnation is performed. This salt serves either to facilitate the subsequent impregnation with nitric acid, or to protect cellulose against the attack that might be feared from this acid.

A third modification consists in making the first impregnation with a solution of a salt that reacts with the chemical agent used for the second impregnation. For instance, when the agent in question consists of nitric acid, I may use for the first impregnation an aqueous solution of a nitrate, and as chemical agent for the second impregnation, an acid that will attack this nitrate so as to produce nitric acid, for instance sulphuric acid.

b. Impregnation after imbibition

After atomized nitric solution has been sprayed on the matter in the form of a thin layer, or after this matter has been immersed for a short time in the nitric lye, the matter to be treated has retained, both by impregnation (to a low degree) and by superficial depositing, the desired volume of solution, as near as possible to 100 per cent and anyway less than 200 per cent. With a homogeneous matter, it is thus possible to obtain the desired amount of solution retained by the matter without being compelled to employ physical means such as centrifugating, pressure, and so on. However, these means may be employed in order to render more regular the amount of solution retained by the matter, for instance in the case of matters that are not homogeneous.

As this amount of solution is retained mostly in the peripheral regions of the matter, it is necessary to force it to penetrate thoroughly and uniformly into said matter. Within the scope of the invention, I may employ for this purpose any process that will not start the reaction before the matter is correctly impregnated. For instance I may leave the matter thus imbibed alone for a sufficiently long time for obtaining this impregnation. I may utilize vacuum, periodical compressions, eventually in combination with means for very slowly and gradually raising the temperature. It is very important that the temperature at which the reaction starts should be reached only when the impregnation is completed. For every matter, experiments will give the necessary indications. For practical purposes, this impregnation must be completed before a temperature of about 50° C. is reached.

4. When the matter has been impregnated, the temperature may be raised very rapidly with a view to producing the desired reaction of the chemical agent (such as nitric acid) on the non cellulosic substances to be dissolved, and it must generally be kept at the proper value so as not to exceed the maximum reaction temperature. As soon as this temperature is reached, the reaction is finished and it must be stopped through any suitable method, for instance by a lowering of the temperature and/or by elimination, by washing with cold or hot water of the remaining small amounts of free acid, if such small amounts exist in the matter, or again by neutralizing this acid by means of a basic lye.

Due to the uniformity of the impregnation, the reaction in question takes place at the same time throughout the whole mass and due to the rapid raise of the temperature, this reaction is also quick. It is thus possible, a very short time after the beginning of the reaction, to stop it, while ensuring a complete removal of the non-cellulosic substances to be eliminated, without any substantial deterioration of the mass of cellulose. This is due to the fact that this deterioration starts, mostly, as soon as the non-cellulosic substances which protected the cellulose have been attacked by the acid. Said acid then comes into contact with cellulose and its action increases very quickly in intensity as the time of contact is prolonged and the temperature raised. The method according to the present invention makes it possible further to reduce this attack, owing to the limiting of the amount of nitric acid present in the volume of solution, which is itself already limited.

If the amount of acid which is brought into action is a little more than what would be strictly necessary for attacking the amount of non-cellulosic substances present in the matter treated, and if the reaction is stopped too late, at the most a small portion of the mass of cellulose will be injured and after this small excess of acid has thus acted, time and temperature no longer have any detrimental action either on the quality of cellulose obtained, or on the yield of the process.

If, as it may be possible, the amount of nitric acid that is brought into play is slightly less than that necessary for the attack of the non-cellulosic substances, cellulose will practically not be attacked whatever be the time and temperature conditions of the reaction. In this case, the operation is simplified and the industrial yield improved, same as the uniformity of the quality of cellulose obtained.

After this operation and, eventually a washing operation with water, the treatment of the matter is finished in the usual manner. For instance, it is treated with an alkaline lye, such as a boiling sodium hydroxide, of low concentration, say from 0.5 to 5 per cent, which makes soluble and dissolves the nitrous components of the non-cellulosic substances, yielding black waters. Then I proceed with a washing with water, and a defibering of the cellulosic paste thus obtained, which is finally purified, and eventually bleached and given the form of sheets.

The invention will now be illustrated by the description of some examples. These examples relate more especially to the nitro-sodic treatment of two vegetable matters which are most commonly used for producing cellulose, to wit: pecto-cellulose plants and especially cereal straws and pine wood.

*First example.*—Straw is cut into small bits of a length of two or three centimeters, knots being cut off as far as possible.

After this matter has been subjected ten minutes to the action of a vacuum of some centimeters of mercury, it is subjected, still in a vacuum, to the action of a nitric solution, 100 kilograms of straw dried in the presence of air being sprayed with 90 litres of a solution containing about 300 grams of nitric acid. The vacuum being still maintained, the solution is caused to impregnate the straw by gradually raising the temperature up to 35° C. within a period of time of about thirty minutes. In order to produce the desired reaction, atmospheric pressure is restored and the temperature raised to 75° C. within a period of time of about fifteen minutes.

The straw is then washed with boiling water in order to remove a portion of the incrustant bodies and colouring matters that have been made soluble by the preceding treatment. This washing water is quite neutral which proves that the whole of the nitric acid in the solution has been used for the reaction.

In order to dissolve the nitrous compounds of the non-cellulosic portions and to delignify the cellulose substance, the whole is treated for sixty minutes by a boiling soda (NaOH) lye of 2 per cent strength. The paste is then freed from this lye, washed with water and defibered.

I thus obtain, with a consumption of 300 grams of nitric acid and without recuperation expenses, about 50 kilograms of unbleached cellulose of good quality containing 1.16 per cent of ashes and 82.25 per cent of α cellulose. When subjected to a bleaching treatment, this paste yielded 92 per cent of bleached cellulose.

*Second example.*—After immersion for five minutes in a solution containing 2 grams of nitric acid per litre, at ordinary temperature and under atmospheric pressure, the temperature is raised very slowly and with an increasing progression, so as to bring it from the value of ordinary temperature (15° C.) to 40° C. within about sixty five minutes. The reaction is produced immediately after this by a quick raise of the temperature. When this temperature has reached 83° C., the straw is washed and treated with soda and the treatment is then finished as set forth in the preceding example.

I thus obtain 50 per cent of a cellulose of the same quality.

The volume of nitric solution retained after impregnation and reaction has been 125 per cent of the amount of matter in weight, and the weight of nitric acid retained and utilized by the straw has been 0.42 per cent of the weight of straw. The water that has served to the washing operation after the reaction is still neutral.

These two examples demonstrate the following facts:

First, the consumption of nitric acid has been lower than 0.5 per cent. Now, if it is admitted that the nitro-sodic treatment of straw generally involves but a low consumption of acid, this consumption is however, in prior methods in which the reaction takes place in the liquid medium constituted by the nitric solution, from 2 to 4 per cent of the weight of raw material dried in air. The reduction of consumption made possible by the invention is therefore about from 75 to 90 per cent as compared with the prior methods that were considered as the less costly in nitric acid.

Secondly, there is no amount of nitric acid to be recovered after treatment, and with a very low consumption of acid and of calories, and also in a very short time, I obtain a high output of a cellulose of good quality.

A further advantage consists in the fact that, if in the prior methods in which the reaction took place in the main nitric solution, cellulose is more or less in contact with the nitric acid in excess, at a temperature approximating 100° C., these conditions being quite favorable to the formation of hydrocellulose, on the contrary, with the method according to the present invention, cellulose (in small proportion with respect to the total amount treated) can be placed under such conditions only when use is made of solutions of concentrations higher than those indicated in the two above set forth examples. But if solutions of high concentration were used, the maximum temperature of the reaction could be limited to a value considerably below 100° C., and the time necessary for effecting the reaction could be considerably reduced. Anyway, if the matter remained for too long a time at this temperature in the solution, the injurious effects would not be so bad as in the prior methods.

*Third example.*—This example relates to the treatment of pine wood shavings subjected to a preliminary impregnation with water, after which the main reaction is performed in air and under atmospheric pressure.

The pine wood is first reduced into thin shavings and thoroughly impregnated with water, through any suitable means. After removal from water, the shavings are caused to drip the amount of water superficially retained by the shavings, by being shaken for some minutes. After this, they retain a volume of water of about 200 per cent, including, for 100 kilograms of shavings dried in air, about 100 litres of uniformly and thoroughly impregnated water and 100 litres superficially retained. They are immediately immersed in a solution containing 250 grams of nitric acid per litre. After half an hour of immersion, the solution is evacuated and the shavings allowed to drip the amount of solution superficially retained therein. The volume of solution retained is still about 200 per cent. The reaction is completed in one hour, during which the temperature is raised from the ordinary value of the surrounding atmosphere to about 73° C., first slowly, then, after this temperature of the matter has reached 50° C., rapidly. The temperature is raised slowly up to 50° C. in order to enable the reaction to take place substantially at the same time in the whole mass of the matter. As soon as the maximum temperaure is reached, the reaction is stopped by proceeding to a washing treatment for a quarter of an hour, successively in cold water and in hot water.

The shavings are then treated for fifteen minutes in a boiling soda lye of a 3 per cent concentration. The paste that is obtained is washed in water and defibered. In this way, I obtain 56 per cent of unbleached cellulose of good quality.

The amount by weight of nitric acid that is retained by the shavings is about 54 per cent of the weight of wood treated. In the washing waters, a weight of acid of about 41 per cent of the weight of wood treated are to be recuperated.

The quantity of acid transformed by the reaction corresponds to 13 per cent of the weight of wood treated.

*Fourth example.*—After direct impregnation with nitric acid by immersion of pine wood shavings for five minutes in a solution containing 250 grams of acid per litre, and with a treatment identical to that of the second example and a maximum temperature of 78° C., I obtain, within a period of time of fifteen minutes, 50 per cent of a cellulose of the same quality with

| | Per cent |
|---|---|
| A retained volume of lye of | 110 |
| A retained weight of acid of | 30 |
| A weight of acid in the washing waters of | 15 |
| A weight of transformed acid of | 15 | these percentages relating to the amount of wood treated, as above.

These two examples show that the reduction in the consumption of acid that is obtained in comparison to what takes place in known methods ranges from 57 to 67 per cent. As a matter of fact, it is known that when the nitro-sodic treatment is applied to wood with a process in which the reaction takes place in the liquid medium of the nitric solution, the consumption of nitric acid is approximately from 35 to 40 per cent of the weight of wood treated. The method according to the present invention can advantageously be applied in continuous fashion.

The matter to be treated is extracted regularly and in a continuous manner from the place where it is stored, and it is conveyed, through any suitable mechanical means, such as endless screws, belts, pushing members, wheels, air streams, etc., employed either alone or in combination, to the apparatus or devices in which must be successively performed, imbibition, impregnation with the disincrusting solution, heating of the impregnated matter so as to produce the reaction of the chemical agent contained in said solution on the matter impregnated therewith, eventual washing with water, treatment by an alkaline lye, and the various conventionally known operations of defibering, purification and final arrangement of the cellulose obtained.

Between these various apparatus or devices may be provided continuous centrifugating means for removing an excess of superficial liquid.

In a general manner, while I have described what I deem to be practical and efficient embodiments of the present invention, it should be well understood that I do not wish to be limited thereto as there might be changes made therein without departing from the principle of the present invention as comprehended within the scope of the appended claims.

What I claim is:

1. The method of extracting cellulose from straw which comprises thoroughly impregnating said straw with a nitric acid solution containing from 2 to 3.33 grams of acid per liter at temperatures ranging from 15 to 40° C., causing this acid to react with said straw by raising the temperature of the straw thus impregnated to a temperature ranging from 73 to 83° C. within a period of about fifteen minutes, immediately stopping the reaction when this temperature is reached, and removing the incrustations from the straw thus treated.

2. The method of extracting cellulose from straw which comprises superficially imbibing said straw with a nitric acid solution containing from 2 to 3.33 grams of acid per liter, then subjecting the straw thus treated to periodic compressions so as to thoroughly impregnate said straw with said solution, this impregnation being performed at temperatures ranging from 15 to 40° C., causing this acid to react with said straw by raising the temperature of the straw thus impregnated to a temperature ranging from 73 to 83° C. within a period of about fifteen minutes, immediately stopping the reaction when this temperature is reached and removing the incrustations from the straw thus treated.

3. The method of extracting cellulose from straw which comprises atomizing a nitric acid solution containing from 2 to 3.33 grams of acid per liter over said straw, then subjecting the straw thus treated to periodical compressions so as to thoroughly impregnate said straw with said solution, this impregnation being performed at temperatures ranging from 15 to 40° C., causing this acid to react with said straw by raising the temperature of the straw thus impregnated to a temperature ranging from 73 to 83° C. within a period of about fifteen minutes, immediately stopping the reaction when this temperature is reached and removing the incrustations from the straw thus treated.

HENRI MAINGUET.

REFERENCES CITED

The following references are of record in the file of this patent:

UNITED STATES PATENTS

| Number | Name | Date |
|---|---|---|
| 115,740 | Keegan | June 6, 1871 |
| 1,354,731 | De Cew | Oct. 5, 1920 |
| 1,829,852 | Darling | Nov. 3, 1931 |
| 1,840,162 | Heimann | Jan. 5, 1932 |
| 1,840,198 | Heimann | Jan. 5, 1932 |
| 1,849,334 | Richter | Mar. 15, 1932 |
| 1,923,292 | Bassett | Aug. 22, 1933 |
| 2,061,205 | Olsen | Nov. 17, 1936 |
| 2,137,779 | Olsen | Nov. 22, 1938 |
| 2,186,893 | Bayerl | Jan. 9, 1940 |
| 2,228,349 | Feldman | Jan. 14, 1941 |
| 2,269,985 | Olsen | Jan. 13, 1942 |
| 2,301,314 | Montanna | Nov. 10, 1942 |
| 2,388,592 | Asplund | Nov. 6, 1945 |

FOREIGN PATENTS

| Number | Country | Date |
|---|---|---|
| 623,150 | Germany | Dec. 14, 1935 |
| 490,101 | Great Britain | Aug. 9, 1938 |

OTHER REFERENCES

Paper Industry and Paper World, Apr. 1939, pp. 41–48.

Paper Industry and Paper World, June 1939, pp. 335–343.